Oct. 26, 1926. 1,604,204
K. TESSKY
STOP FOR TOOL SLIDES
Filed June 30, 1925
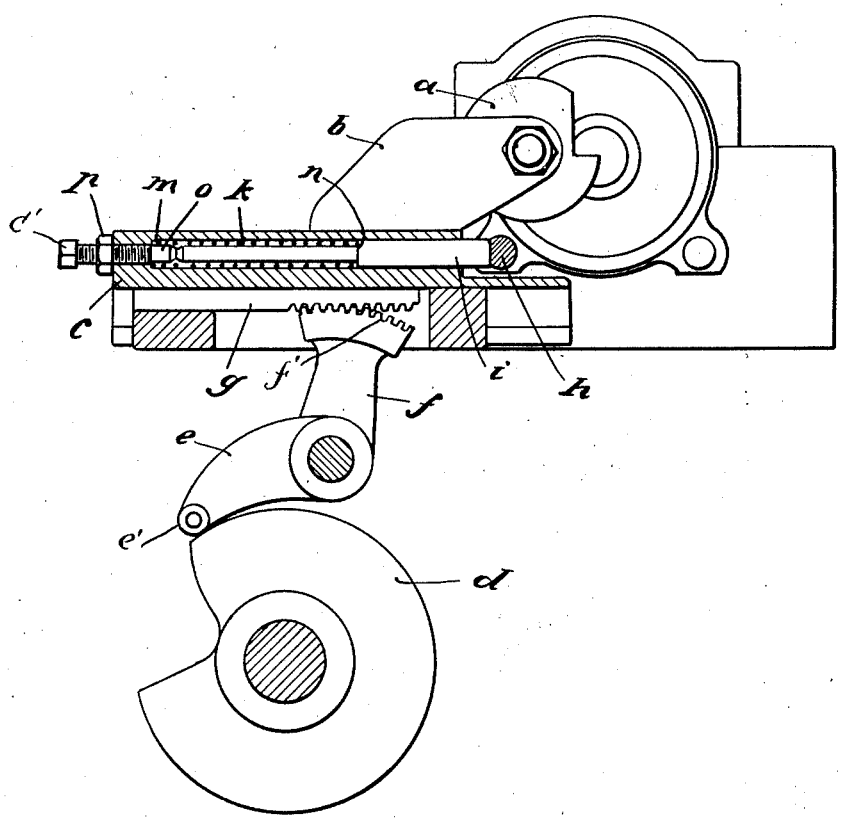
Inventor:
Karl Tessky
by K⸺
Atty.

Patented Oct. 26, 1926.

1,604,204

UNITED STATES PATENT OFFICE.

KARL TESSKY, OF ESSLINGEN-ON-THE-NECKAR, GERMANY.

STOP FOR TOOL SLIDES.

Application filed June 30, 1925, Serial No. 40,648, and in Germany July 21, 1924.

My invention relates to the tool slides of machine tools and more especially to a stop for limiting the stroke of tools, particularly in automatic and similar machines in which the tool is automatically fed a predetermined distance relative to the work. In such machines, a fixed stop for the tool is indispensable because the resistance to the tool feed varies in accordance with the quality of the work-piece and the condition of the cutting edge, so that the parts would not be tooled uniformly if the stroke of the tool were not limited by a positive stop.

In similar machines as hitherto designed the operation of such stops is often interfered with by chips, dirt and other foreign matter entering between the stop and the buffer with which the stop cooperates.

It is an object of my invention to prevent this drawback. To this end, while arranging a positive stop in the vicinity of the tool, that is, where the stop is accessible to chips and other foreign matter, I so arrange the buffer which cooperates with the stop and I so connect with this buffer the pull-back spring for the tool slide that the outer end of the buffer is held in permanent engagement with the stop and no foreign matter can enter at this point between the face of the buffer and the stop. I also provide an auxiliary stop for the inner end of the spring-buffer in the tool slide. At this point the contacting faces of the spring-buffer and the stop separate, but the gap is protected by the wall of the tool slide so that the entrance of foreign matter is absolutely prevented.

In the drawings affixed to this specification and forming part thereof a device embodying my invention is illustrated diagrammatically in elevation, partly in axial section, by way of example. Referring to the drawings, $a$ is the tool which is held in a tool holder $b$ on a tool slide $c$. $d$ is a cam from which the tool silde is actuated through the medium of a double-armed lever $e$, $f$, provided with a roller $e'$ at one end and a toothed segment $f'$ at the other, which meshes with a rack $g$ on the tool slide $c$.

$h$ is a stop secured to the work holder $q$, and $i$ is a spring buffer carried in the tool slide $c$ and adapted to cooperate with the principal stop $h$. A spring $k$ placed over the reduced end of the buffer $i$ abuts against the shoulder $n$ on the buffer at one end and a shoulder $m$ of the tool-slide $c$ at the other end. $o$ is an auxiliary stop secured in the tool-slide $c$ co-axially with the buffer $i$ and adapted to be adjusted by means of a nut $o'$ and to be held by a set-screw $p$.

It will be understood that on the return stroke of the tool-slide $c$ the reaction of the spring $k$ against the shoulder $n$ holds the buffer $i$ in contact with the stop $h$, while on the forward stroke of the tool slide the spring $k$ is compressed between the shoulders $m$ and $n$ and the buffer is thus also held against the stop $h$ so that it can never be forced out of contact with the stop and the entrance of foreign matter between the contact faces of the stop $h$ and the buffer $i$ is effectively prevented.

The stop $h$ is flattened on one side so as to form an abutment for the flat end of the buffer. If desired, a circular recess may be provided in the stop into which enters the end of the buffer so that a projecting edge is formed which surrounds the end of the buffer and absolutely prevents the entrance of foreign matter. This modification will easily be understood by an expert without being illustrated.

By combining the bores for the spring buffer $i$ and the auxiliary stop $o$ the design is much simplified and the size of the device is correspondingly reduced.

I wish it to be understood that I do not desire to be limited to the exact details of construction shown and described, for obvious modifications will occur to a person skilled in the art.

I claim:—

1. Stop for tool slides comprising a tool slide, mechanism for moving said slide, a spring for returning it to its initial position, a stationary stop and a buffer adapted to reciprocate in said slide against the action of said spring and to be held in permanent contact with said stationary stop by said spring.

2. Stop for tool slides comprising a tool slide, mechanism for moving said slide, a spring for returning it to its initial position, a stationary stop, a buffer adapted to reciprocate in said slide against the action of said spring and to be held in permanent contact with said stationary stop by said spring and an adjustable auxiliary stop in said slide adapted to positively limit the stroke of said slide.

In testimony whereof I affix my signature.

KARL TESSKY.